United States Patent [19]

Ikegaya

[11] Patent Number: 4,913,494
[45] Date of Patent: Apr. 3, 1990

[54] SEAT APPARATUS HAVING A RECLINING APPARATUS

[75] Inventor: Isao Ikegaya, Kosai, Japan

[73] Assignee: Fujikiko Kabushiki Kaisha, Tokyo, Japan

[21] Appl. No.: 224,652

[22] Filed: Jul. 27, 1988

[30] Foreign Application Priority Data

Jul. 31, 1987 [JP] Japan .............................. 62-116828[U]
Sep. 24, 1987 [JP] Japan .............................. 62-145869[U]
Jan. 28, 1988 [JP] Japan ................................ 63-9588[U]

[51] Int. Cl.$^4$ ............................................... B60N 1/02
[52] U.S. Cl. .................................... 297/367; 297/355; 297/369
[58] Field of Search ................. 297/355, 367, 368, 369

[56] References Cited

U.S. PATENT DOCUMENTS

| | | | |
|---|---|---|---|
| 2,712,345 | 7/1955 | Borisch | 297/369 |
| 4,337,978 | 7/1982 | Kazoka et al. | 297/367 |
| 4,767,158 | 8/1988 | Satoh | 297/367 |
| 4,770,463 | 7/1988 | Nishino | 297/367 |

FOREIGN PATENT DOCUMENTS 0006610 6/1979 European Pat. Off. ............ 297/367

Primary Examiner—James T. McCall
Attorney, Agent, or Firm—Foley & Lardner, Schwartz, Jeffery, Schwaab, Mack, Blumenthal & Evans

[57] ABSTRACT

A reclining apparatus comprises a back arm pivotally mounted to a holder plate and having a latch gear portion; a lower teeth section pivotally mounted to the holder plate and engaged with and disengaged from the latch gear portion to lock and unlock the back arm; a cam pivotally mounted to the holder plate and contacting the lower teeth section; a joining portion joined to the cam and an operating lever; and a device for moving the joining portion to locate the joining portion on the rear side of the holder plate when the lower teeth section is completely locked with the latch gear portion, and to locate at least a portion of the joining portion from the rear side of the holder plate to a visible place when the lower teeth section is imcompletely locked with the latch gear portion.

A reclining apparatus may comprise a base plate for fixing a seat cushion thereto; an arm fixing a seat back thereto and pivotally mounted to the base plate; an upper teeth section fixed to the arm; a lower teeth section engagable with the upper teeth section and pivotally mounted to the base plate; an operating lever engagable with the lower teeth section and pivotally mounted to the base plate; a holder plate opposite the base plate and supporting therebetween the arm, the upper teeth section and the lower teeth section, the lower teeth section having a shaft portion projecting outwards from the holder plate; and a pedal-link device pivotally mounted to the shaft portion and the operating lever.

Another reclining apparatuses different in construction from the above reclining apparatuses are also disclosed.

17 Claims, 15 Drawing Sheets

F I G. 16
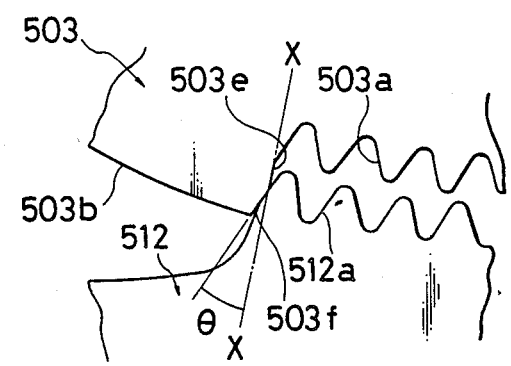

SEAT APPARATUS HAVING A RECLINING APPARATUS

The present invention relates to a seat apparatus having a reclining apparatus for a vehicle, and in particular, to a reclining apparatus of a step-inclining type for a vehicle in which a seat can be inclined forwards by the stepping operation of an operator's foot.

BACKGROUND OF THE INVENTION

A main portion of a conventional reclining apparatus of a seat for a vehicle of this kind will be described with reference to FIGS. 1 and 2.

In FIG. 1, an arm 3a is disposed in a rear side portion of a base plate 1 and is fixed to an upper teeth section 3 having a latch gear 2 at the lower edge thereof, and is pivotally mounted to a shaft 4. The arm 3a is biased by an unillustrated spring in the direction of arrow 5. A lower portion of an unillustrated back arm is fixed to the arm 3a. A holder plate 6 disposed outside the upper teeth section 3 is fixed to shafts 4, 7 and 8 respectively fixed to the base plate 1. A lower teeth section 9 is disposed between the holder plate 6 and the base plate 1, and is biased in the counterclockwise direction in FIG. 3 by an unillustrated spring pivotally attached to the shaft 8 in a base portion thereof. A teeth portion 9a formed at a free end of the lower teeth section 9 is engaged with and disengaged from the latch gear 2 by a roller described later to lock and unlock the back arm fixed to the arm 3a.

An operating lever 11 and a roller 12 mounted outside the operating lever 11 are respectively pivotally mounted to the shaft 7. The operating lever 11 is biased in the direction of arrow 14 by a compression spring 13 engaged with the base plate 1 and the operating lever 11 at both ends thereof. The teeth portion 9a of the lower teeth section 9 and a side edge 9b thereof opposite the teeth portion 9a press and contact the roller 12. The teeth portion 9a of the lower teeth section 9 presses and contacts the latch gear 2 of the upper teeth section 3 by the biasing force of the compression spring 13 acting on the operating lever 11, thereby locking the upper teeth section 3 and the back arm integral therewith.

As shown in FIG. 2, a pin 16 fixed to the lower teeth section 9 extends through an elongated hole 15 disposed in the base plate 1. When the distance between the pin 16 and a side edge of the elongated hole 15 is a predetermined length, the teeth portion 9a of the lower teeth section is completely locked by the latch gear 2 of the upper teeth section 3. An attaching portion 17 is formed in a suitable portion of the holder plate 6 by bending a free end thereof to attach a rear portion of an unillustrated finisher cover for closing a side face of the base plate 1. A bent piece 18 is disposed in a suitable portion of the holder plate 6 on an upper edge side thereof to prevent dust from entering an engaging portion of the upper teeth section 3 and the lower teeth section 9.

In the reclining apparatus of a seat for a vehicle, it is checked in an assembly process whether the lower teeth section 9 and the latch gear 2 of the upper teeth section 3 are reliably locked or not. For example, there is a case in which the teeth portion 9a of the lower teeth section 9 is not reliably locked by the latch gear 2 of the upper teeth section 3 by errors in processing state and accuracy, etc. of the respective parts constituting the reclining apparatus, so that the teeth portion 9a is separated from the latch gear.

In the conventional reclining apparatus mentioned above, to check whether the lower teeth section 9 is incompletely locked or not, a clearance gauge is inserted into a clearance formed between the pin 16 of the lever 11 and a side edge of the elongated hole 15 of the base plate 1 to check whether the length of the clearance is proper or not. Another method for confirming the locking state is performed by measuring the rotatable position of the operating lever 11 manually or mechanically.

In the method in which the locking state of the lower teeth section is checked by a clearance gauge, it is necessary to process the elongated hole 15 and the pin 16 used for only the confirmation of the locking state, and operate the clearance gauge for confirmation. Further, it is difficult to confirm the locking state in the method in which an extension of the lower teeth section 9 is manually measured.

In general, when a seat provided with a reclining apparatus is disposed in the so-called two door or three door type vehicle, a seat back is inclined forwards by the operation thereof on the rear seat side so as not to disturb the front seat's side when a person setting on the rear seat gets into and out of the vehicle, for example. The reclining apparatus of this type is normally of the so-called latch type in which the slanting angle of the seat back is changed at many stages. In the reclining apparatus of the latch type, as shown in FIG. 3, in a base plate 52 fixed to a seat cushion 51, an arm 54 fixed to a seat back 55 is biased by a return spring 57 and is pivotally supported by a rotary shaft 53. An upper teeth section 58 is attached to the arm 54 and has a teeth portion located on the circumference thereof around the rotary shaft 53. A lower teeth section 59 is rotatably supported by the base plate 52 and partially has a teeth portion engaged with the teeth portion of the upper teeth section 58. An operating lever 63 engaged with the lower teeth section 59 to rotate it is pivotally supported and biased by a coil spring 64. To incline the seat back 55 forwards from the rear seat, a pedal 65 is pivotally supported by a shaft 60 in a holder plate 56 for supporting a shaft portion such as a rotary shaft 53 opposite the base plate 52, and the pedal 65 is connected to the operating lever 63 by a link 68. Accordingly, when the pedal 65 is depressed, the operating lever 63 is rotated in association with the pedal and the lower teeth section 59 is thereby rotated, so that the engagement of the lower teeth section 59 and the upper teeth section 58 is released and the upper teeth section 58 is rotated. Accordingly, the arm 54 fixed to the seat back 55 is rotated and inclined forwards by the resilient force of the return spring 57. Thus, the person sitting on the rear seat can independently operate the seat back even when no person sits on the front seat.

However, in accordance with the conventional reclining apparatus in which the seat back is inclined by the stepping operation, the lower teeth section 59 and the pedal 65 are constructed such that they are supported by the same shaft 60 between the base plate 52 and the holder plate 56. Therefore, such a structure has the disadvantages with respect to the mechanically engaging strength of the lower teeth section 59 and the upper teeth section 58, and is different in assembly from the general reclining apparatus since the structure has the pedal and the link. Accordingly, in such a structure, it is not avoidable to branch or separately dispose a line process for assembling the reclining apparatus in which the seat back is inclined by the stepped operation on the way to a line process for assembling the standard reclining apparatus, thereby increasing the cost of the apparatus and making the apparatus expensive.

In another conventional reclining apparatus for a vehicle, a seat back can be inclined in the forward and backward directions to take an easy and most comfortable position of a person sitting on the seat. In such a reclining apparatus, an arm is pivotally mounted to a base plate fixed to a seat cushion and is fixed to the seat back so as to be inclined at a predetermined angle through a reclining operating mechanism attached to the base plate. The reclining operating mechanism is composed of a teeth member integrally joined to the arm or an end thereof, and a ratchet pivotally mounted to the base plate and engagable with and disengagable from the teeth member. An operating lever is disposed to oscillate the latchet and is provided with a cam engagable and disengagable from the latchet and is pivotally mounted to the base plate(see Japanese Laid-Open Utility Model No. 55-51310 and Japanese Published Utility Model No. 62-34840).

It is ideal to dispose the reclining apparatus of this type as a pair on the right and left sides of the seat, but a hinge device is often used on either one of the right and left sides to reduce the cost of the seat apparatus. However, when such a hinge device is substituted for the reclining apparatus on one of the right and left sides and the weight of a person sitting on the seat is applied to the seat back by inertia due to the increase in vehicle speed, etc., the seat back is twisted on the side of the hinge device, thereby providing an uncomfortably sitting feeling to the person.

To solve the problems mentioned above, the reclining apparatus has been recently symmetrically disposed on both right and left sides of the seat in many cases. However, when the reclining apparatus is disposed on the right and left sides of the seat in such a way and the seat back is inclined, it is necessary to separately operate right and left operating mechanisms for releasing and locking the engagement of teeth members respectively disposed in the reclining apparatuses, which is a complicated operation. Therefore, the reclining apparatuses have a structure in which one of the right and left mechanisms is moved in association with the other. In such an associating structure, the right and left reclining apparatuses may have the same construction in which shafts of respective operating levers are connected to each other through a shaft so as to drive the apparatuses in association with each other. However, in general, the reclining apparatuses are often driven by a wire in association with each other. In such a structure, the relation between pulling and pulled sides must be provided so that the right and left reclining apparatuses are symmetrically disposed, and are moved in the reverse direction with respect to each other. Otherwise, the right and left reclining apparatuses have the same construction by arranging the wire backwards from a lower portion of the seat cushion.

However, in the structure associated by the wire, when the right and left symmetrical reclining apparatuses are used, it is necessary to dispose two lines of manufacture, increasing the cost of the apparatus. Also, when the right and left reclining apparatuses having the same construction are used and the wire is arranged below a rear portion of the seat cushion, a space for feet of a person sitting on the rear seat becomes small.

When the right and left reclining apparatuses having the same construction are used and the wire is arranged below a front portion of the seat cushion, the relation between the pulling and pulled sides is formed in the right and left reclining apparatuses, as described before. Accordingly, it may be constructed such that, when an operating lever of a main reclining apparatus is rotated to pull the wire, the wire pushes and rotates an operating lever of a driven reclining apparatus. However, it is complicated to press and rotate the operating lever of the driven reclining apparatus by the wire, and the cost is increased and it is also difficult to realize such a structure.

The reclining apparatus is divided into two types, the one for rotating the operating lever manually, and the other for rotating the operating lever by depressing a pedal by a person's foot(see Japanese Laid-Open Utility Model No. 55-51310). Therefore, it is desirable that the structure can be also used in the reclining apparatus of the above step-operating type when the associating structure mentioned above is used.

In general, in a reclining apparatus of a two door type vehicle in which it is necessary to incline the seat back of a front seat forwards when a person sits on the rear seat, hen the seat back is gradually inclined forwards, the seat back can be positioned to a certain degree of the position thereof, but can be freely inclined forwards without the positioning thereof after a certain limited position of the seat back.

FIG. 4 shows a main portion of another conventional reclining apparatus of a seat for a vehicle of this kind.

In FIG. 4, an upper teeth section 103 has a latch gear 103a, and a lower teeth section 112 has a teeth portion 112a engagable with and disengagable from the latch gear 103a. The upper teeth section 103 and the lower teeth section 112 are engaged with each other. The upper teeth section 103 is fixed to a back arm pivotally mounted to a base plate 102 described later and fixing a seat back thereto, and the lower teeth section 112 is pivotally mounted to the base plate 102. A sliding face 103b is formed in a front end portion of the latch gear 103a and rises from an end bottom portion of the latch gear 103a and projects from a teeth tip of the latch gear 103a. A rising face 103d between the sliding face 103b and the bottom portion of the latch gear 103a is formed by extending a side face of the bottom portion.

When the teeth portion 112a of the lower teeth section 112 is disengaged from the latch gear 103a of the upper teeth section 103 by an operating lever 113 described later, the upper teeth section 103 becomes rotatable so that the operating lever 113 returns to the original position thereof by the biasing force of a tension spring 118 described later when an operator separates the operating lever 113 from his hand in a predetermined position, thereby pressing the lower teeth section 112 and engaging the teeth portion 112a with the latch gear 103a again.

When a person sits on the rear seat in the two door type vehicle having the above reclining apparatus and the seat back is inclined forwards excessively, the teeth portion 112a of the lower teeth section 112 contacts the sliding face 103b of the upper teeth section 103 so that the seat back is not positioned. However, when the seat back is raised, the teeth portion 112 of the lower teeth section 112 relatively slides the sliding face 103b. When the teeth portion 112a is disengaged from the sliding face 103b, the teeth portion 112a is automatically engaged with the latch gear 103a by the tension spring 118 biasing the operating lever 113.

However, at this engaging time, the teeth portion 112a of the lower teeth section 112 is located between a teeth face of the latch gear 103a of the upper teeth section 103 and the rising face 103d thereof as shown in FIG. 5, causing a half locking state in which the teeth portion 112a is not completely engaged with the latch gear 103. When such a half locking state occurs, a large load is applied to the seat back when the vehicle is moved first, etc., and the half locking is released, causing a very dangerous state.

To remove the half locking state, a safe reclining apparatus has been proposed in Japanese Laid Open Utility Model No. 59-41154. FIG. 6 shows an engaging state between a latch gear 103a and a teeth portion 112a of a lower teeth section 112. A guide face 103e is disposed in a corner portion of the sliding face 103b and extends from an upper edge of an end bottom portion of the latch gear 103a to the sliding face 103b in the normal direction of a pitch circle of the latch gear 103a. In this embodiment, when the teeth portion 112a is slided on the sliding face 103b and thereafter is engaged with the latch gear 103a and one end of the teeth portion 112a is slided and guided along the guide face 103e, the other end of the teeth portion 112a contacts a teeth tip of the latch gear 103a so that the teeth tip of the other end of the teeth portion 112a can be engaged with the latch gear 103a while sliding and guiding the one end of the teeth portion 112a by the guide face 103e. Therefore, the teeth portion 112a and the latch gear 103a can be engaged with each other without causing the half locking state therebetween.

When the seat back in the sitting state is moved to the forwardly inclined state by the insufficient operation of the operating lever 113, an end portion of the teeth portion 112a of the lower teeth section 112 might not be located outside a moving orbit of the guide face 103e in a certain case. In such a case, the guide face 103e collides with the end portion of the teeth portion 112a by the biasing force of a spiral spring 107 described later, damaging the teeth portion 112a. Further, since the corner portion of the guide face 103e is formed in the shape of an acute angle, the durability of a molding die therefor is low when the upper teeth section 103 is molded.

SUMMARY OF THE INVENTION

To overcome the problems mentioned above, an object of the present invention is to provide a reclining apparatus for easily confirming complete and incomplete locking states of a lower teeth section without using any means for confirming the locking state of the lower teeth section which are not necessary for the function of the apparatus itself.

Another object of the present invention is to provide a reclining apparatus for reducing the cost thereof and improving the assembling structure thereof.

Another object of the present invention is to provide a reclining apparatus which does not require a large space for foot of a person sitting on a rear seat.

Another object of the present invention is to provide a reclining apparatus which is safe and is not easily damaged without causing any half locking state.

With the above objects in view, the present invention resides in a reclining apparatus comprising back arm means pivotally mounted to a holder plate means and having a latch gear portion; lower teeth means pivotally mounted to the holder plate means and engaged with and disengaged from the latch gear portion to lock and unlock the back arm means; cam means pivotally mounted to the holder plate means and contacting the lower teeth means; a joining portion joined to the cam means and an operating lever means; and means for moving the joining portion to locate the joining portion on the rear side of the holder plate means when the lower teeth means is completely locked with the latch gear portion, and to locate at least a portion of the joining portion from the rear side of the holder plate means to a visible place when the lower teeth means is incompletely locked with the latch gear portion.

The present invention also resides in a reclining apparatus comprising base plate means for fixing a seat cushion thereto; arm means fixing a seat back thereto and pivotally mounted to the base plate means; upper teeth means fixed to the arm means; lower teeth means engagable with the upper teeth means and pivotally mounted to the base plate means; operating lever means engagable with the lower teeth means and pivotally mounted to the base plate means; holder plate means opposite the base plate means and supporting therebetween the arm means, the upper teeth means and the lower teeth means; said lower teeth means having a shaft portion projecting outwards from the holder plate means; and pedal-link means pivotally mounted to said shaft portion and the operating lever means.

The present invention also resides in a seat apparatus including first and second reclining apparatuses disposed on both sides of a seat back to lock and unlock the seat back, said seat apparatus comprising wire means for actuating the first and second reclining apparatuses in association with each other; first lever means pivotally mounted to the first reclining apparatus and connected to one end of the wire means; and second lever means disposed in the second reclining apparatus and connected to the other end of the wire means.

The present invention also resides in a reclining apparatus comprising base plate means fixed to a seat cushion; back arm means pivotally mounted to the base plate means and fixed to a seat back and having latch gear means and a sliding face projecting from the latch gear means; means for biasing the back arm means on the side of seat cushion; lower teeth means pivotally mounted to the base plate means and having a teeth portion engagable with and disengagable from the latch gear means; and means for separating the teeth portion of the lower teeth means from the sliding face when the sliding face contacts the teeth portion of the lower teeth means by the biasing force of the biasing means.

BRIEF DESCRIPTION OF THE DRAWINGS

The present, invention will be more apparent from the following description of the preferred embodiments thereof in conjunction with the accompanying drawings in which:

FIG. 16 is a view showing an engaging state between a latch gear and a teeth portion of a lower teeth section of FIG. 15.

DETAILED DESCRIPTION OF THE PREFERRED EMBODIMENTS

The preferred embodiments of the present invention will now be described with reference to the accompanying drawings.

Figure 7:
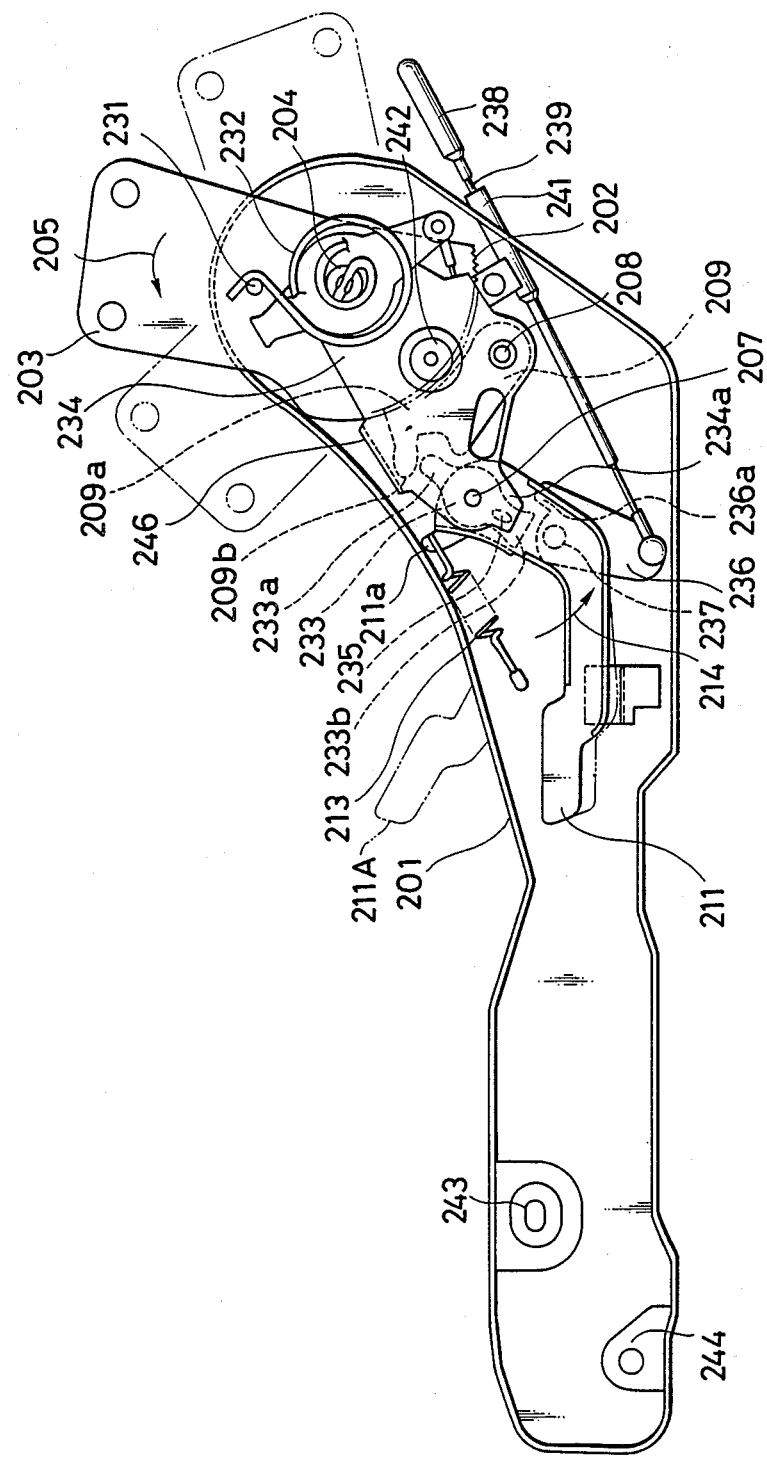
FIG. 7 is a side view of a reclining apparatus of a seat for a vehicle in accordance with one embodiment of the present invention.

In FIG. 7, an upper teeth section 203 is biased by a spiral spring 232 engaged with a shaft 204 and a pin 231 fixed to the upper teeth section 203 at both ends thereof in the direction of arrow 205. A cam 233 has an intermediate portion pivotally mounted to a shaft 207 and is integral with an operating lever 211 as described later. One end 233a(the upper end in FIG. 7) of the cam 233 contacts a side edge 209b of a recessed portion of a lower teeth section 209 formed on the opposite side of a teeth portion 209a thereof by the resilient force of a compression spring 213. An extending portion 234a is formed below the shaft 207 in a holder plate 234 corresponding to a holder plate 6 of FIG. 1.

An extending portion 233b is formed on the opposite side of a free end 233a of the cam 233. The extending portion 233b and the operating lever 211 outside the extending portion 233b are engaged with each other by a joining portion 235. The joining portion 235 is constructed such that an embossed portion formed in the extending portion 233b of the cam 233 is fitted to a hole formed in the operating lever 211. The joining portion 235 is located on the rear side of the extending portion 234a of the holder plate 234 when the teeth portion 209a of the lower teeth section 209 is in a completely locked state as shown in FIG. 7 where an operator cannot visually look at the joining portion 235 from the exterior.

A base portion of the back lever plate 236 is pivotally mounted to a base plate 201 by a shaft 237, and has a projecting portion 236a opposite a side edge of the extending portion 233b of the cam 233. A rod 239 is engaged at one end thereof with a free end of the back lever plate 236 and has a grip 238 at the other end, and is slidably attached to the base plate 201 through a holding member 241. An embossed portion 242 for attaching an unillustrated finisher cover is formed approximately in a central portion of the respective shafts 204, 207 and 208 attached to the holder plate 234, and in a position which is not located on a line connecting at least the respective shafts 204, 207 and 208. The finisher cover is attached to the embossed portion 242 and embossed portions 243 and 244 disposed in a front portion of the base plate 201.

Figure 1:
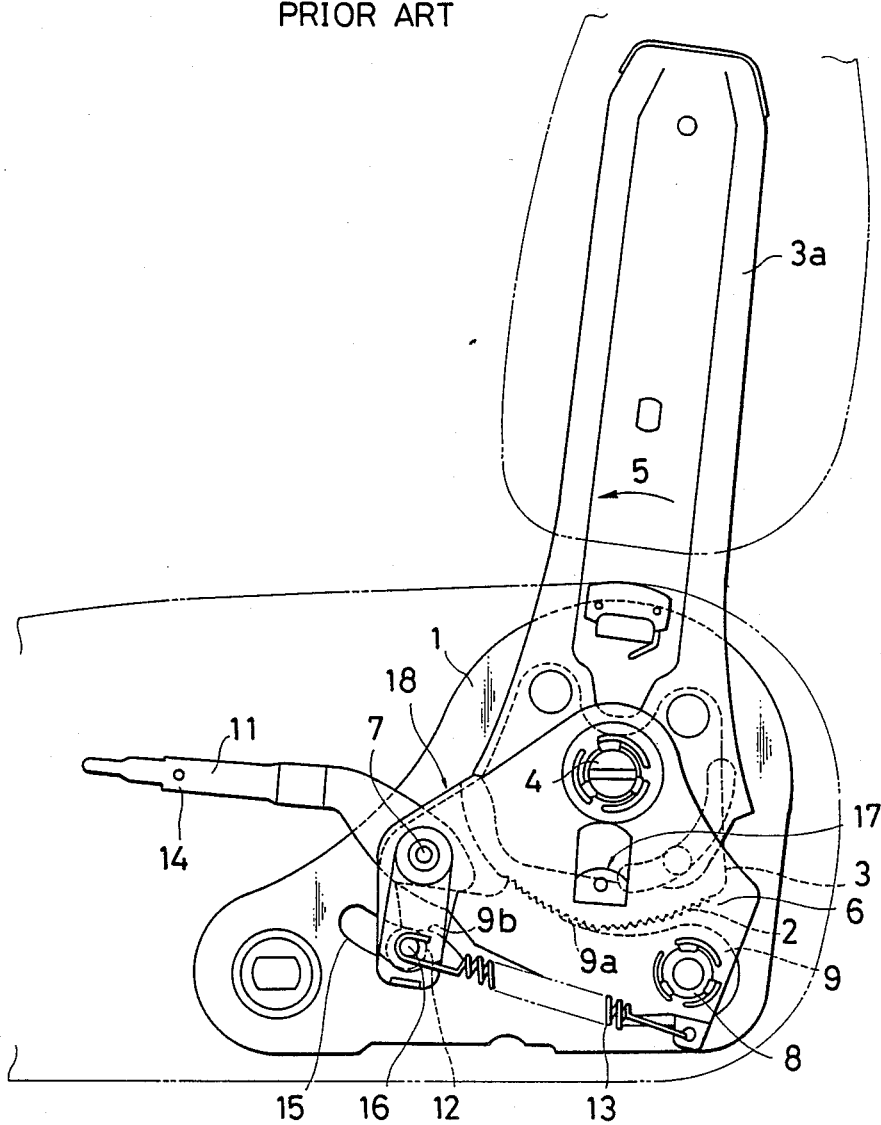
FIG. 1 is a side view showing an example of a conventional reclining apparatus of a seat for a vehicle.
Figure 2:
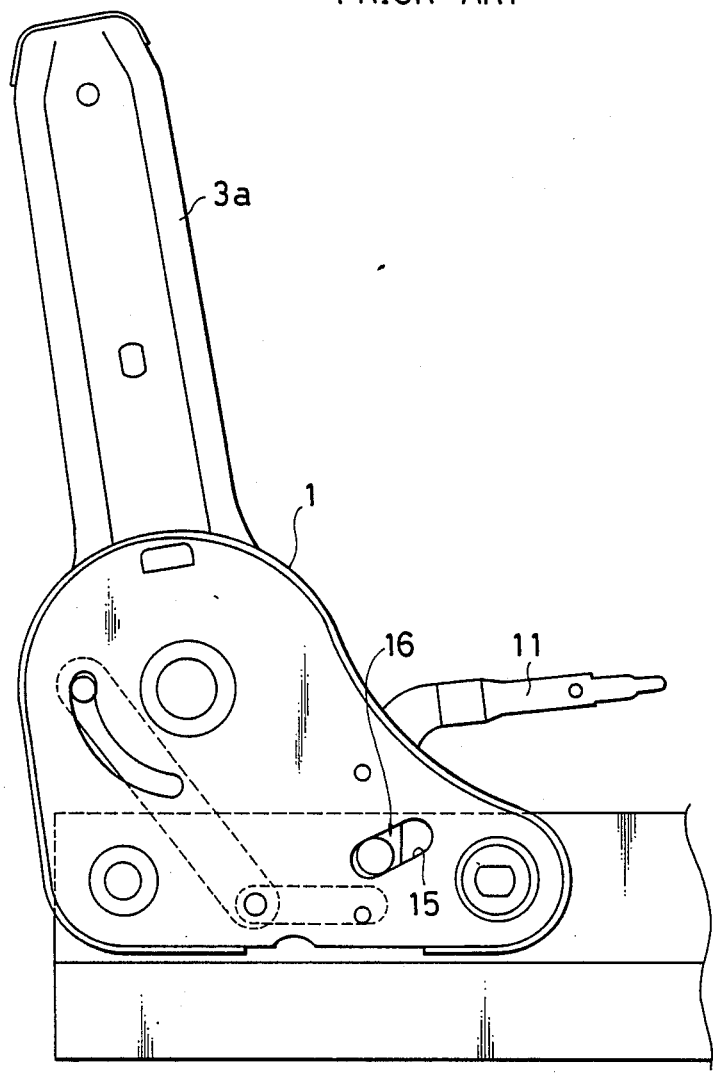
FIG. 2 is a rear view of the conventional reclining apparatus.
Figure 3:
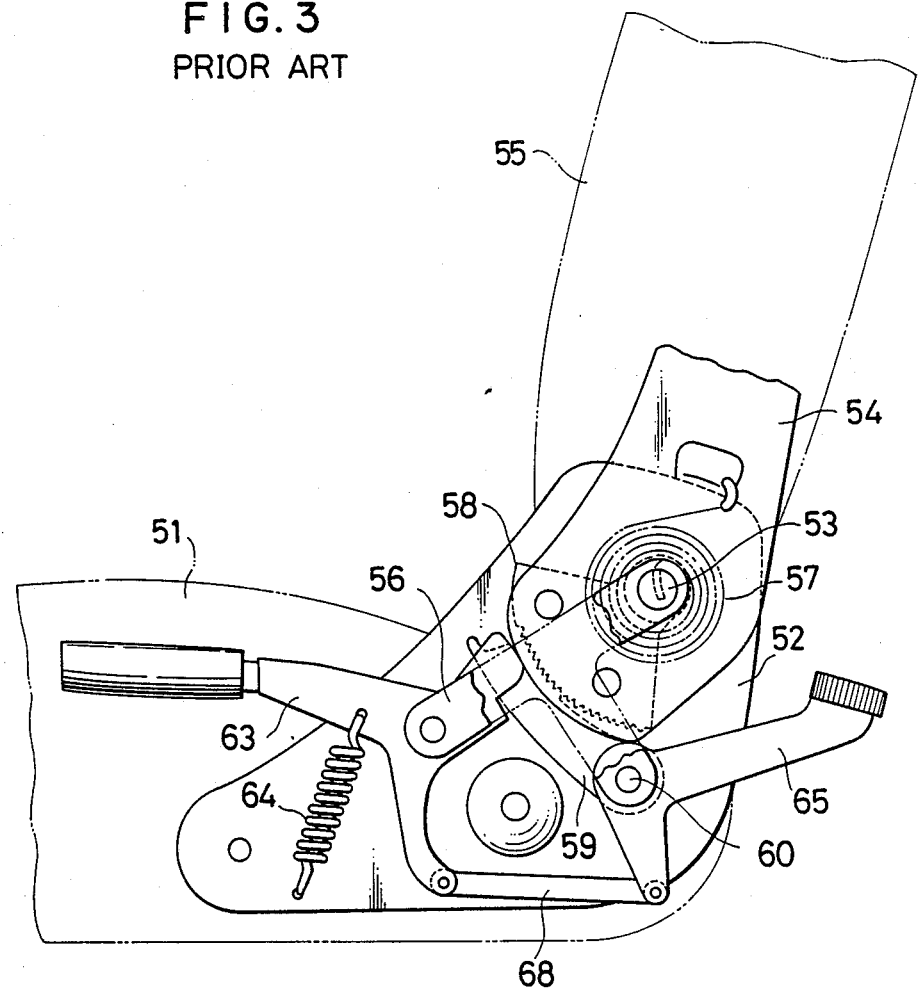
FIG. 3 is a front view showing a main portion of another conventional reclining apparatus.
Figure 4:
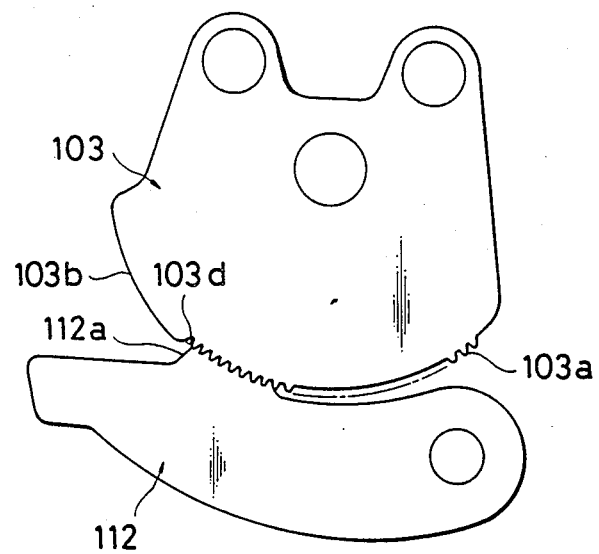
FIG. 4 is a view showing an engaging state of a latch gear and a teeth portion of a lower teeth section in another conventional reclining apparatus.
Figure 5:
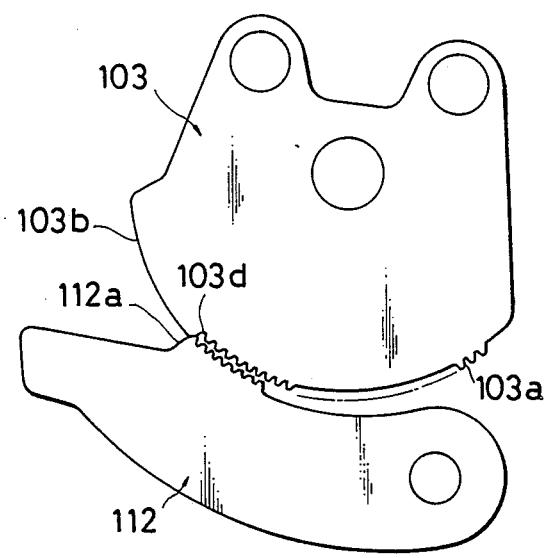
FIG. 5 is a view showing a half locking state of the latch gear and the teeth portion of the lower teeth section of FIG. 4.
Figure 6:
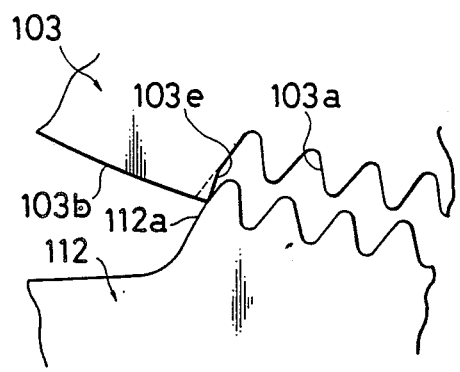
FIG. 6 is a side view showing the engaging state of the latch gear and the teeth portion of the lower teeth section in another conventional reclining apparatus.

When the finisher cover is attached to the holder plate 6 of FIG. 1 in the conventional apparatus, the attaching portion 17 is formed by cutting the holder plate 6 so that the mechanical strength of the holder plate 6 is reduced by a hole formed by the cutting operation thereof However, in the present invention, the embossed portion 242 is disposed as the attaching portion so that the reduction of the mechanical strength can be prevented.

Further, since the embossed portion 242 is located in a position in which an unillustrated seat belt is hung and the seat belt is normally hung through the finisher cover, there is no contact between the seat belt and the embossed portion 242. However, since the finisher cover is generally made of synthetic resin, the seat belt directly contacts the embossed portion 242 when the vehicle collides and the finisher cover is damaged. At this time, since the embossed portion 242 has a round shape different from the sharpened shape such as that of the attaching portion 17 of the conventional holder plate 6, thereby preventing the damage of the embossed portion 242 irrespective of the slide movement thereof with respect to the seat belt.

When the operating lever 211 is rotated from the position shown by solid line of FIG. 7 to the position shown by chain line 211A, the cam 233 is rotated in the same direction and the lower teeth section 209 is thereby rotated in the counterclockwise direction in FIG. 7, so that the teeth portion 209a is disengaged from the latch gear 202, thereby releasing the locking state of the upper teeth section 203 and the back arm integral therewith. Before the free end 233a of the cam 233 presses and contacts the other side edge 209c of the recessed portion formed in the side edge of the lower teeth section 209, the engaging piece 211a of the operating lever 211 engaged with the compression spring 213 presses and contacts the front end 246a of a bent piece 246 of the plate 234, thereby restricting the rotation of the operating lever 211.

Figure 8:
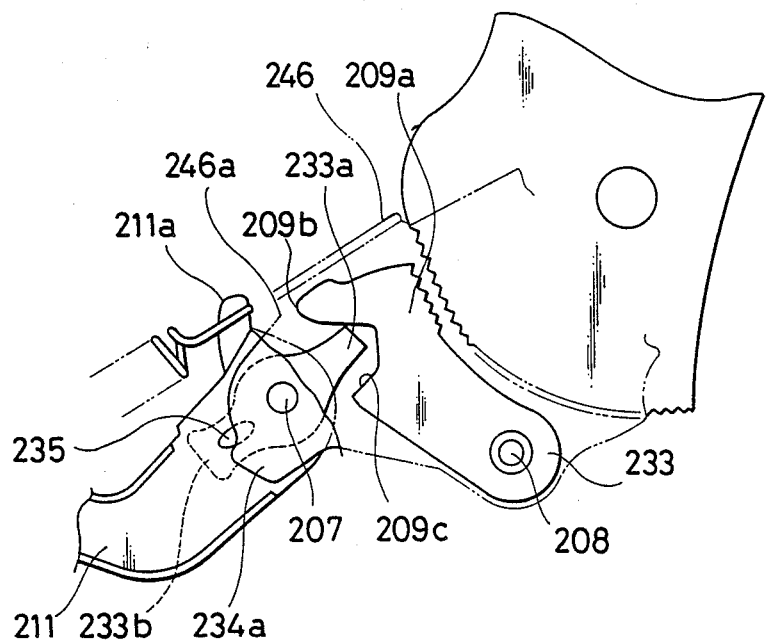
FIG. 8 is a view showing the operation of the reclining apparatus of FIG. 7.

When the free end 233a of the cam 233 presses and contacts the other side edge 209c of the recessed portion formed in the lower teeth section 209 as shown in FIG. 8 and the rotation of the operating lever 211 is restricted, a strong load is applied to the joining portion 235 between the operating lever 211 and the cam 233 in the restricting position of the operating lever 211 when an operator operating the reclining apparatus strongly rotates the operating lever 211 in the direction of chain line 211A to release the locking state of the lower teeth section 209. By the repetition of such load, rattle is caused in the hole of the operating lever 211 fitted to the embossed portion of the cam 233, thereby causing an incomplete connection thereof.

However, the bent piece 246 is formed such that the engaging piece 211a and the front end 246a of the bent piece 246 can be engaged with each other before the free end 233a of the cam 233 presses and contacts the side edge 209c of the lower teeth section 209. Thus, the bent piece 246 has a main function for preventing the dust and a function for holding the soundness of the joining portion 235.

When the reclining apparatus is assembled, there is a case in which the teeth portion 209a of the lower teeth section 209 is incompletely locked with the latch gear 202 of the upper teeth section 203 due to errors, etc. in accuracy in parts and accuracy in attachment. At this incomplete locking time, as shown in FIG. 8, the operating lever 211 and the cam 233 integral therewith are located in a position in which they are slightly rotated from the state of FIG. 7 in the clockwise direction. By the rotation of the cam 233, a portion of the joining portion 235 is located in a visible place from the extending portion 234a of the holder plate 234 as shown in FIG. 8. Accordingly, the operator can easily confirm the complete and incomplete locking states of the lower teeth section 209 by only checking whether the joining portion 235 is visible or not.

The extending portion 234a is added to the holder plate 234 to confirm the complete locking state of the lower teeth section 209, and contributes to the prevention of oscillation of the operating lever 211 by the contact of the extending portion 234a with an outer face of the operating lever 211. Further, the extending portion 233b on the lower end side of the cam 233 is engaged with the projecting portion 236a of the back lever plate 236 when the back lever plate 236 is rotated by the operation of the grip 238 in the clockwise direction, thereby using the extending portion 233b to release the locking state of the lower teeth section 209.

As mentioned above, in accordance with the embodiment mentioned above, the cam and the operating lever are joined by the visible joining portion. The joining portion is in the externally invisible state in which the joining portion is located on the rear face side of the lower teeth section when the lower teeth section and the latch gear of the upper teeth section are completely locked. When the lower teeth section and the latch gear are incompletely locked, the joining portion is moved to the visible position from the holder plate by the rotation of the cam by the incomplete locking operation. Accordingly, the complete and incomplete locking states of the lower teeth section can be easily confirmed by only confirming the visible and invisible states of the joining portion by an operator for assembling the reclining apparatus. This confirmation is performed without disposing any dedicated means for confirming the locking state of the lower teeth section.

Figure 9:
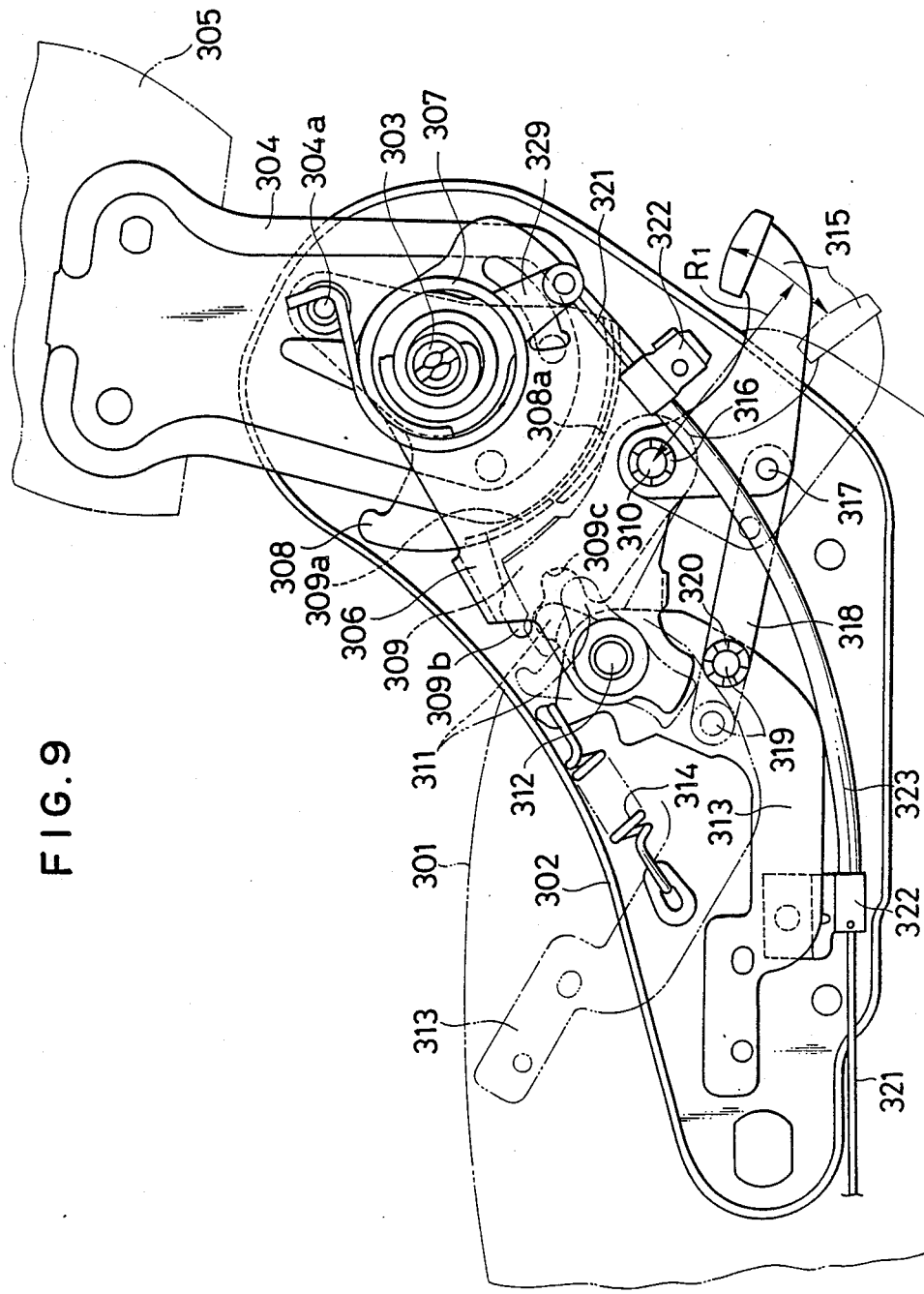
FIG. 9 is a front view showing a main portion of a reclining apparatus in accordance with another embodiment of the present invention.

FIG. 9 shows another embodiment of the present invention. In this figure, an arm 304 is pivotally supported by a base plate 302 fixed to a seat cushion 301 around a rotary shaft 303 as a center. The arm 304 is fixed to a seat back 305 and is disposed between the base plate 302 and a holder plate 306. A return spring 307 is attached to the rotary shaft 303 on the holder plate 306 to bias the arm 304 in the counterclockwise direction. An upper teeth section 308 is integrally fixed to the arm 304, and has a teeth portion 308a located on a circumference having a constant radius around the rotary shaft 303 as a center. A lower teeth section 309a partially has a teeth portion 309a engagable with the teeth portion 308a and is pivotally mounted to the base plate 302 by a shaft 310. The lower teeth section 309 has a cam projecting portion 309b and a cam recessed portion 309c. A cam 311 is engaged with and disengaged from the cam projecting portion 309b and the cam recessed portion 309c, and is pivotally mounted to the base plate 302 by a shaft 312. The cam 311 is integrally fixed to an operating lever 313, and is integrally rotated around the shaft 312 together with the operating lever 313. The operating lever 313 is biased and rotated through the coil spring 314 in the counterclockwise direction. The holder plate 306 rotatably supports the rotary shaft 303 and the shafts 310 and 312. A pedal 315 is rotatably supported by an end portion of the shaft 310 projecting on the holder plate 306, and a push nut 316 is then disposed to prevent the extraction of the pedal 315. A link 318 is connected at one end thereof by a pin 317 to the pedal 315, and is rotatably mounted at the other end by a pin 319 to the operating lever 313. A push nut 320 is attached to the pin 319 to prevent the extraction of the link 318. A wire 321 is connected at one end to a walk-in lever 329 contacting a hook pin 304a of the return spring 307 and integrally inclining therewith when the arm 304 is inclined forwards, and is connected at the other end to a locking portion of an unillustrated seat slide mechanism. The wire 321 extends through a tube 323 fixed to the holder plate 306 and the base plate 302 through attaching members 322 to fulfill the so-called walk-in function in which the wire 321 is pulled when the arm 304 is inclined forwards, thereby releasing the locking state of the seat slide mechanism.

The operation of the apparatus mentioned above will now be described.

When the seat back 305 is inclined forwards, a person sitting on a rear seat depresses the pedal 315 by his foot, the pedal 315 is rotated around the shaft 310 in the clockwise direction and the link 318 thereby presses and rotates the operating lever 313 around the shaft 312 in the clockwise direction. The cam 311 integrally rotated with the operating lever 313 is moved to the cam recessed portion 309c of the lower teeth section 309, and rotates the lower teeth section 309 around the shaft 310 in the counterclockwise direction. Accordingly, the lower teeth section 309 is separated from the upper teeth section 308 and the teeth portions 308a and 309a are disengaged from each other so that the arm 304 becomes rotatable around the rotary shaft 303, and is rotated and inclined forwards by the action of the return spring 307. The the arm 304 is inclined forwards, the wire 321 is pulled and the locking state of the seat slide mechanism is released so that the entire front seat is moved forwards along the slide rail.

Figure 10:
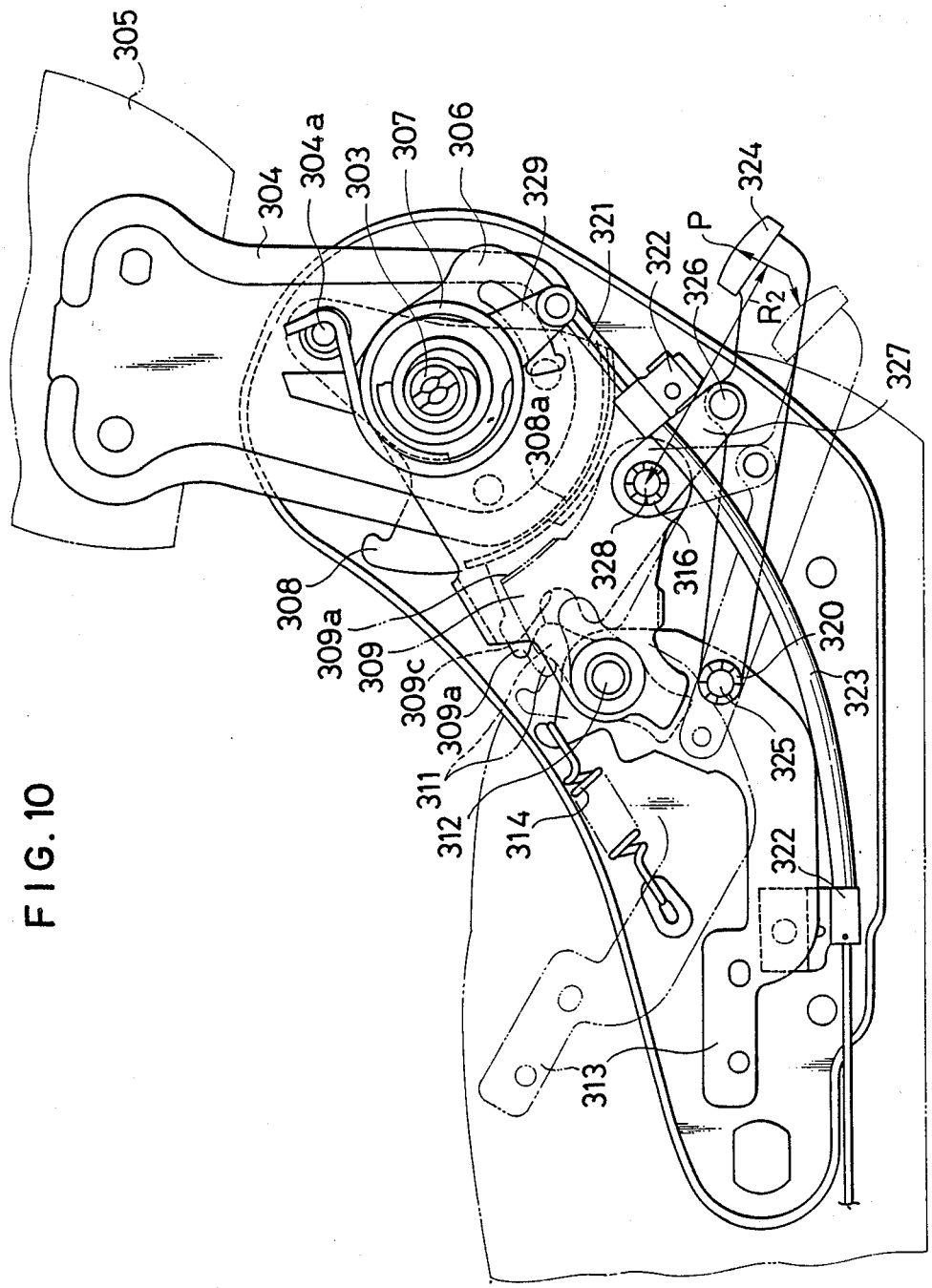
FIG. 10 is a front view showing a main portion of a reclining apparatus in accordance with another embodiment of the present invention.

FIG. 10 shows another embodiment of the present invention. A reclining apparatus in this embodiment has a construction similar to that of the embodiment shown in FIG. 9. In this embodiment, the pedal 324 has a length for pivotally mounting it to the operating lever 313 directly by a pin 325, and is connected to a link 327 pivotally mounted at one end thereof to a pin 326 and is pivotally mounted to the holder plate 306 by a pin 328 at the other end of the link 327. The other construction is similar to that of the embodiment shown IN FIG. 9, and therefore the description with respect to the same reference numerals is omitted in the following description.

The operation of the apparatus shown in FIG. 10 will now be described.

When the pedal 324 is depressed by a foot, as in the embodiment shown in FIG. 9, the operating lever 313 is rotated around the shaft 312 in the clockwise direction, and the lower teeth section 309 is rotated around the shaft through the cam 311 in the counterclockwise direction, thereby disengaging the upper teeth section 308 and the lower teeth section 309 from each other. Thus, the arm 304 is rotated forwards by the biasing force of the return spring 307, and the seat back 305 is inclined forwards. However, the features of this embodiment different from the embodiment shown in FIG. 9 are that the contact of the foot and the pedal 324 in the depressing operation first draws a curve having radius $R_2$ connecting the pin shaft 328 and its contact point P, and thereafter approximately draws a straight line slanting forwards and downwards by the movement of the shaft 328 pressed by the pedal 324. In the embodiment shown in FIG. 9, the pedal 315 moves along a circle having radius $R_1$ around the shaft 310 as a center, which is different from the embodiment of FIG. 10. Accordingly, in the embodiment shown in FIG. 10, even when an unintentional force is applied to the pedal 324 and the pedal 324 is slightly rotated around the shaft 328 as a center, the operating lever 313 is not moved unless a slantingly downward linear force is further applied to the pedal 324, so that the seat back 305 is not inclined forwards unintentionally. Accordingly, the rotary movement of the operating lever 313 through the pedal 324 is provided by two continuous operations, performing the action of fail safe.

As mentioned above, in the reclining apparatus in accordance with the above embodiment, an arm for fixing a seat back thereto is biased and pivotally mounted to a base plate fixing a seat cushion thereto, and is fixed to an upper teeth section. A lower teeth section partially has a teeth portion engaged with the upper teeth section, and is pivotally mounted to the base plate. The operating lever provided with the cam engaged with the lower teeth section is pivotally mounted to the base plate. A holder plate is disposed to oppose the base plate and support therebetween the arm, the upper teeth section and the lower teeth section. A shaft portion of the lower teeth section is projected outwards from the holder plate, and the pedal and the link are respectively pivotally mounted to the shaft portion and the operating lever. The pedal is disposed outside the holder plate so that the mechanical engaging strength of the lower teeth section and the upper teeth section is not affected by the pedal. Further, the reclining apparatus of the above step-inclining type and the standard reclining apparatus have a common assembly structure, so that, after the standard reclining apparatus is assembled, the pedal and the link are attached thereto, completing the reclining apparatus of the step-inclining type. Thus, it is not necessary to change or branch processes in manufacture and assembly of the reclining apparatus, reducing the cost of the apparatus. Further, by changing the positions of the pedal and the link, the stepping operability is improved and the pedal is not rotated by an unintentional force, thereby using a construction having the action of fail safe and improving the safety.

Figure 11:
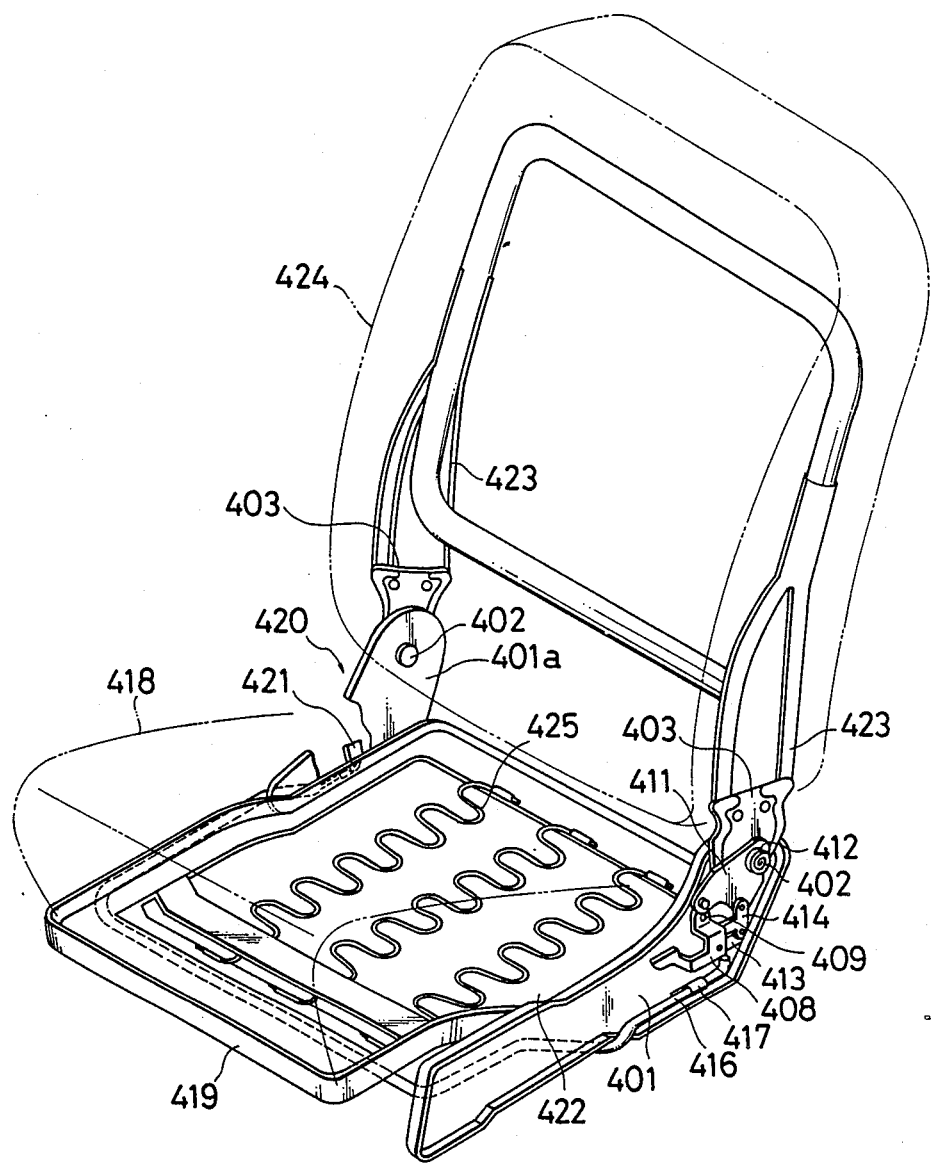
FIG. 11 is a perspective view showing a main portion of a reclining apparatus in accordance with another embodiment of the present invention.
Figure 12:
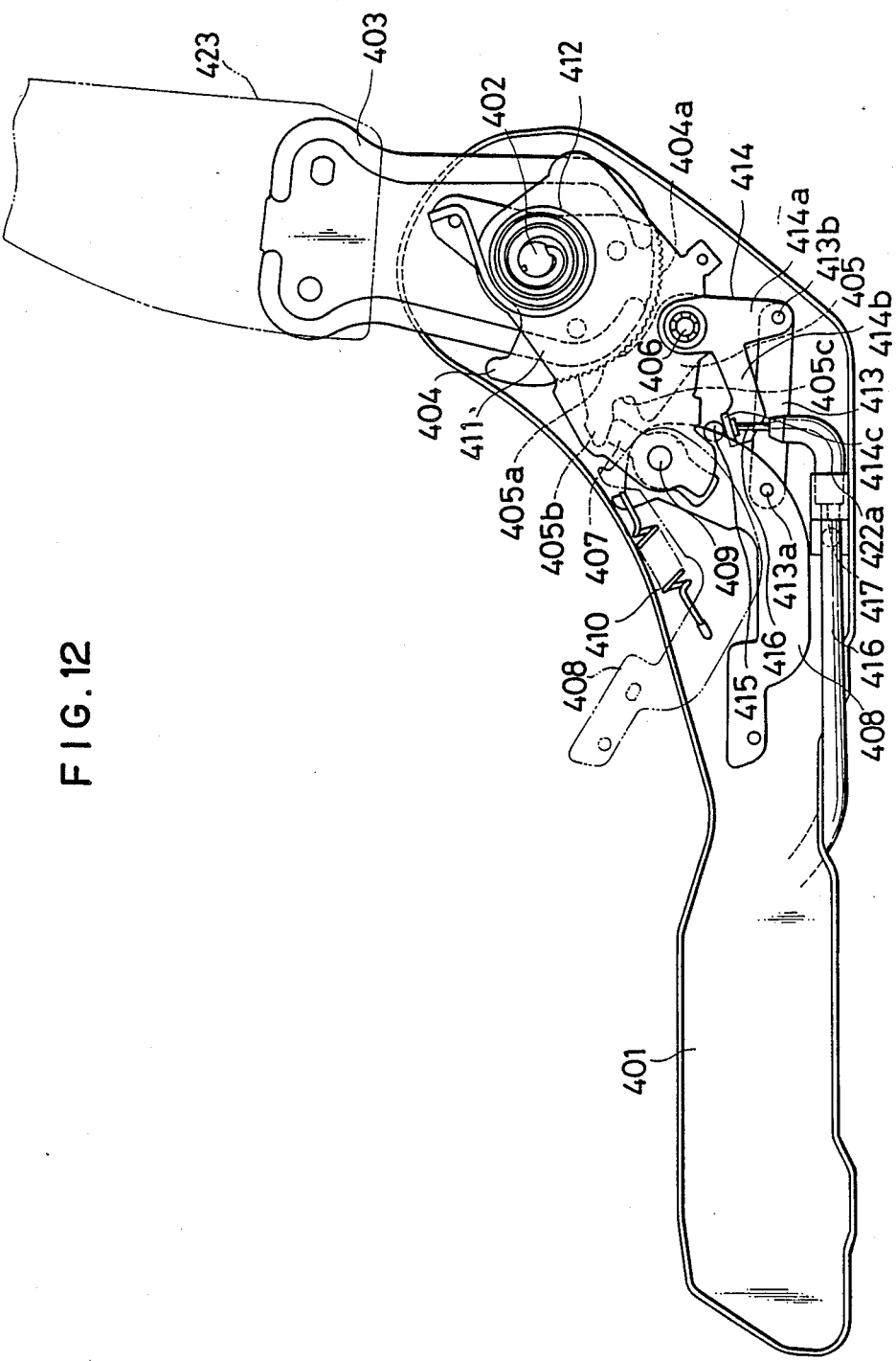
FIG. 12 is a side view showing the construction of a main reclining apparatus.
Figure 13:
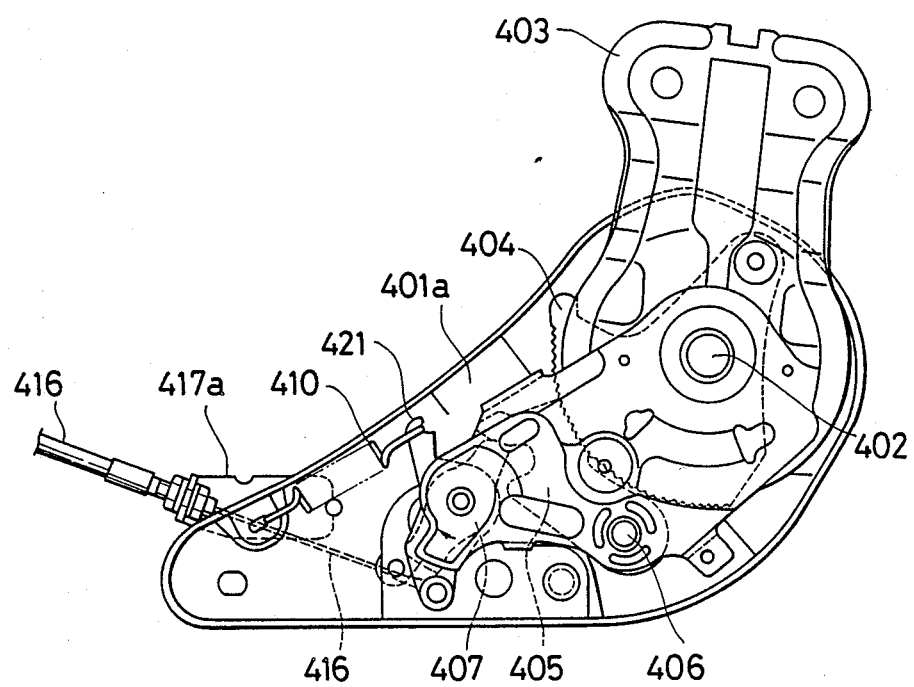
FIG. 13 is a side view showing the construction of a driven reclining apparatus.

FIGS. 11 to 14 show another embodiment of the present invention. In FIGS. 11 to 13, an arm 403 is pivotally mounted to a base plate 401 through a shaft 402, and is integrally fixed to a teeth member 404 having a teeth portion 404a. A latchet 405 has a teeth portion 405a engaged with the teeth portion 404a of the teeth member 404, and is pivotally mounted to the base plate 401 around a shaft 406. The latchet 405 has a cam projecting portion 405b and a cam recessed portion 405c which are engaged with and disengaged from a cam 407 pivotally mounted to the base plate 401 through a shaft 409 integrally with the operating lever 408. A spring 410 is connected at one end thereof to the operating lever 408 and is connected at the other end thereof to the base plate 401 so that the operating lever 408 is biased in the counterclockwise direction at any time. The shafts 402, 406 and 409 are fixed at one ends thereof to the base plate 401 and are fixed at the other ends thereof to a reinforcing plate 411. A spring 412 is attached to the shaft 402 to bias the arm 403 in the counterclockwise direction. As shown in FIG. 12, a link 413 is pivotally mounted at one end thereof to the operating lever 408 through a shaft 413a, and is pivotally mounted at the other end thereof to a lever portion 414a of a back lever 414 through a shaft 413b. The back lever 414 is pivotally mounted to the base plate 401 around the shaft 406 and has two branched lever portions 414a and 414b. The lever portion 414b has a rising portion 414c formed by perpendicularly bending an end of the lever portion 414b and connected to an end portion of a wire 416 through a ball end 415. The wire 416 extends through a guide tube 422a supported by a support member 417 attached to a side portion of the base plate 401 onto an inner side of the base plate 401 through a tube 422 connected to the guide tube 422a. The wire 416 is further connected to a driven reclining apparatus 420 on the other side through a front lower portion of a seat cushion frame 419 for disposing a seat cushion 418 thereon. The driven reclining apparatus 420 has a construction similar to that of the main reclining apparatus, but, as shown in FIG. 13, does not have an operating lever. Instead of this operating lever, the driven reclining apparatus has a lever 421 pivotally mounted to a base plate 401a and connected at one end thereof to the other end of the wire 416. The tube 422 of the wire 416 is supported by an attaching member 417a fixed to the base plate 401a. The base plate 401a is different in length from the base plate 401, but has substantially the same construction as that of the base plate 401, and the arm 403 is biased and pivotally mounted to the base plate 401a. The arm 403 is connected to a seat back frame 423 as shown by phantom line of FIG. 11, and a seat back 424 is attached to the arm 403. A spring 425 for cushion is disposed in the seat cushion frame 419.

The operation of the apparatus mentioned above will now be described.

When the seat back 424 is inclined, the operating lever 408 of the main reclining apparatus is rotated around the shaft 406 in the clockwise direction as shown by the phantom line of FIG. 12. Thus, the cam 407 integral with the operating lever 408 is engaged with the cam recessed portion 405c of the latchet 405 and rotates the latchet 405 in the counterclockwise direction. Accordingly, the engagement of the teeth portions 404a and 405a of the teeth member 404 and the latchet 405 is released so that the arm 403 is rotated around the shaft 402 in a direction in which the arm is biased by the spring 412. At this time, the link 413 connected at one end thereof to the operating lever 408 is pulled leftwards in FIG. 12 so that the back lever 414 is rotated around the shaft 406 in the clockwise direction and the lever portion 414b raises the wire 416 upwards. When the wire 416 is pulled, it pulls and rotates the lever 421 of the driven reclining apparatus 420 as well as the operating lever 408, and rotates an unillustrated latchet of the driven reclining apparatus 420, thereby releasing the engagement of a teeth portion thereof and the teeth portion of the teeth member. Accordingly, the right and left reclining apparatuses release the locking state of the seat back 424 in association with each other. When the seat back 424 is fixed at a predetermined angle by a person sitting on the seat, the operating lever 408 returns to the original position by the resilient force of the spring 410 when the person separates his hand from the operating lever 408. At this time, the back lever 414 is rotated around the shaft 406 in the counterclockwise direction so that the wire 416 becomes free on the side of the driven reclining apparatus 420. Accordingly, the lever 421 of the driven reclining apparatus 420 returns to its original position since the lever 421 is provided with a spring corresponding to the spring 410 as well as the operating lever 408. By such an action, the cam 407 pushes up the cam projecting portion 405b and rotates the latchet 405 in the clockwise direction, and the teeth portion 404a and 405a are engaged with each other, thereby locking the seat back 424 at the set inclination angle.

Figure 14:
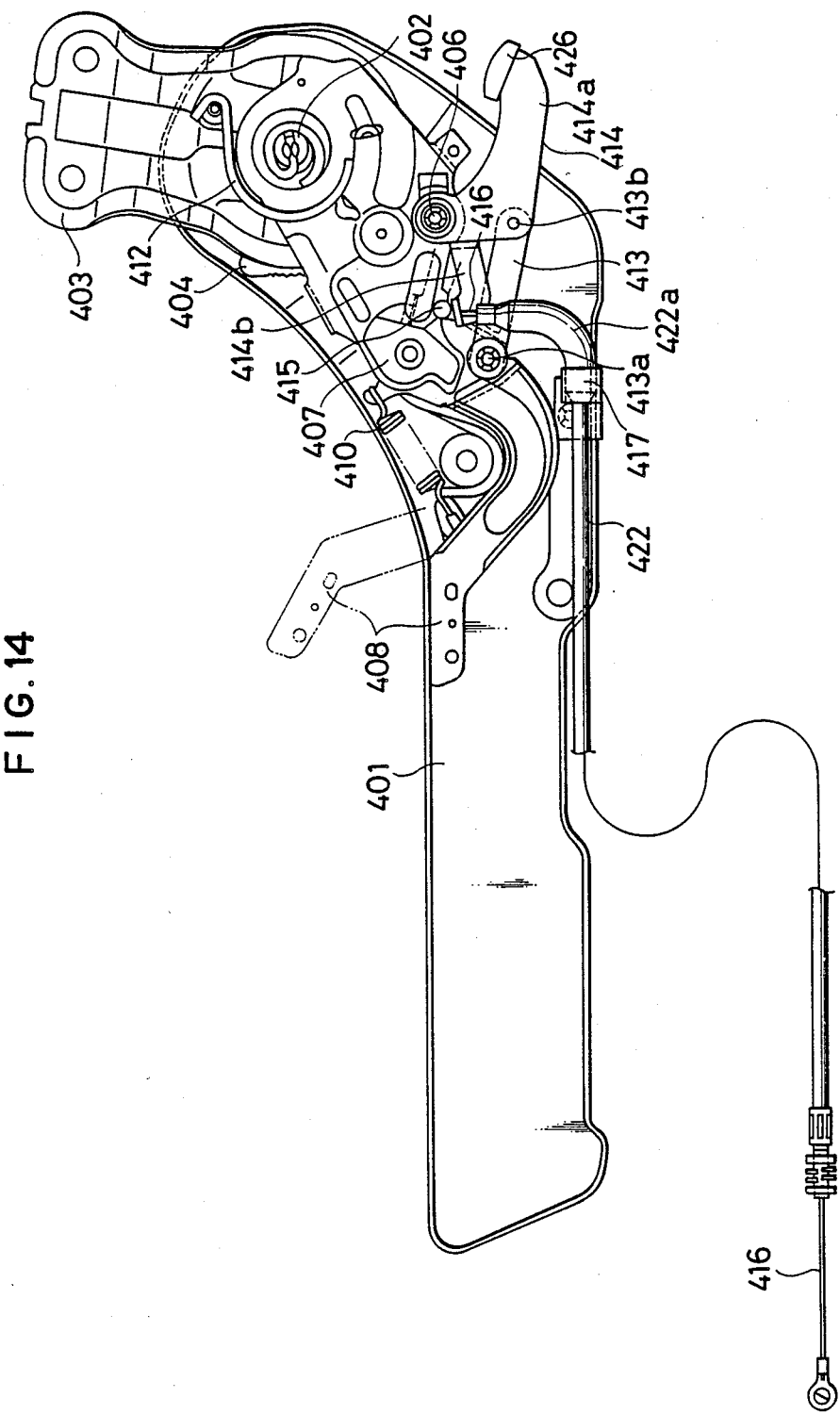
FIG. 14 is a side view showing another embodiment of the main reclining apparatus.

In FIG. 14, the shape of the back lever 414 is different from that in the above embodiment, and a lever portion 414d for the stepping operation is formed in the back lever and a pedal 426 is attached to an end of the lever portion 414d, and the lever portion 414a is formed in the shape of an L. The other construction is the same as that of the above embodiment. In this embodiment, when the operating lever 408 is rotated, the action is the same as that in the above embodiment. Further, even when the pedal 426 is depressed, the same operation is provided. Accordingly, when a person sitting on the rear seat gets into and out of the vehicle, it is easy for the person to incline the seat back of the front seat forwards.

As mentioned above, in accordance with the present invention, in the associating structure of the pair of reclining apparatuses disposed on the right and left sides of a single seat apparatus, the back lever rotated in association with the operating lever is rotatably disposed coaxially with the latchet in the main reclining apparatus. The wire is connected at one end thereof to the back lever and is connected at the other end thereof to the operating lever of the driven reclining apparatus or a lever instead of the operating lever. Accordingly, when the operating lever of the main reclining apparatus is operated, the operating lever of the driven reclining apparatus or the lever instead of this operating lever is rotated in the same direction. Thus, the wire can be moved in the same direction when the right and left reclining apparatuses having the same construction are used. Accordingly, it is not necessary to symmetrically dispose the right and left reclining apparatuses so that the cost of both lock reclining apparatuses can be reduced. Further, since the back lever is attached coaxially with the latchet, no space therefor is needed and the present invention can be applied without changing any fundamental design of the reclining apparatus.

Figure 15:
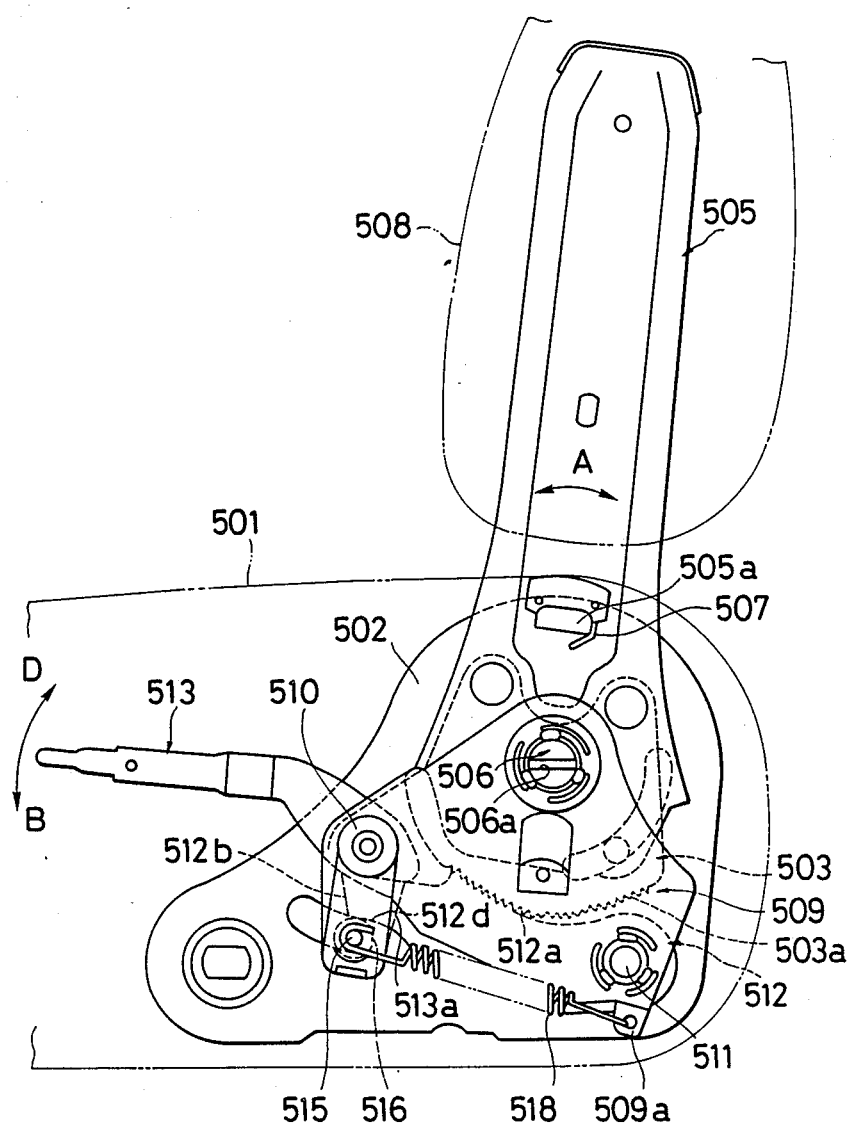
FIG. 15 is a side view showing a reclining apparatus in a seat for a vehicle in accordance with another embodiment of the present invention.

FIG. 15 shows another embodiment of the present invention. In FIG. 15, a back arm 505 is pivotally mounted by a pivotal shaft 506 to a base plate 502 fixed onto a side face of a seat cushion 501 and is fixed to an upper teeth section 503 having a latch gear 503a at a lower edge thereof. A spiral spring 507 as a resilient member is disposed between a hook portion 505a disposed in the back arm 505 and a groove 506a formed in the pivotal shaft 506, and biases the back arm 505 in the direction of arrow A at any time.

A holder plate 509 is disposed outside the upper teeth section 503 and is fixed to pivotal shafts 506, 510 and 511 fixed to the base plate 5402. A base portion of the lower teeth section 5123 is pivotally disposed by the pivotal shaft 511 between the holder plate 509 and the base plate 502. A teeth portion 512a engaged with the latch gear 503a is disposed at a free end of the lower teeth section 512, and a cam portion 512b is formed in an end portion of the lower teeth section 512.

An operating lever 513 in the shape of bell crank is pivotally mounted to the pivotal shaft 510. A slide roller 516 is rotatably supported by a pin 515 disposed in an operating portion 513a of the operating lever 513 and contacts a lower face 512d of the cam portion 512b of the lower teeth section 512. A tension spring 518 as a resilient member is engaged at one end thereof with the pin 515 and is engaged at the other end thereof with an engaging portion 509a formed in the holder plate 509 and biases the operating lever 513 in the direction of arrow B at any time.

when the operating lever 513 is rotated in the direction of arrow D against the biasing force of the tension spring 518, the slide roller 516 is separated from the lower face 512d of the cam portion 512b and the lower teeth section 512 is rotated by the weight thereof in the counterclockwise direction in FIG. 15. Thus, the teeth portion 512a is disengaged from the latch gear 503a of the upper teeth section 503, and the back arm 503 becomes rotatable so that the operating lever 513 is rotated by the biasing force of the tension spring 518 in the direction of arrow B when the operator separates the operating lever 513 from his hand in a predetermined position. Thus, the teeth portion 512a can be engaged with the latch gear 503a by pressing the lower teeth section 512 through the slide roller 516 and the cam portion 512a.

As shown in FIG. 16, a tapered face 503f is formed in a corner portion of the guide face 503e of the upper teeth section 503, and angle $\theta$ formed between the tapered face 503f and straight line X—X extending from an upper edge of an end bottom portion of the latch gear 503a in the normal direction of a pitch circle of the latch gear 503a is close to an angle of pressure applied by the latch gear 503a. The angle $\theta$ is greater than the angle of pressure and is most preferably to be close to the angle of pressure.

The operation of the above reclining apparatus in the embodiment of the present invention will now be described.

When an operator inclines the seat back 508 in the sitting state forwards, the operator pivots the operating lever 513 against the biasing force of the tension spring 518 in the direction of arrow D. Thus, the operating portion 513a is integrally pivoted with the operating lever 513 in the same direction so that the slide roller 516 is separated from the lower face 512d of the cam portion 512b of the lower teeth section 512. Hence, the lower teeth section 512 is pivoted by the weight thereof around the pivotal shaft 511 in the counterclockwise direction, thereby separating the teeth portion 512a of the lower teeth section 512 from the latch gear 503a.

In this state, the back arm 505 can be rotated by the biasing force of the spiral spring 507 in the direction of arrow A. At this time, the operating lever 513 is insufficiently operated and the pivotal angle is small, the end portion of the teeth portion 512a of the lower teeth section 512 might be located within the moving orbit of the tapered face 503f in some case. When the tapered face 503f contacts the end portion of the teeth portion 512a of the lower teeth section 512, the lower teeth section 512 is pressed by the tapered face 503f and is pivoted around the pivotal shaft 511 in the counterclockwise direction in FIG. 15 so that the end portion of the teeth portion 512a is located outside the moving orbit of the tapered face 503f, thereby preventing the teeth portion 512a from being damaged.

As mentioned above, in accordance with the present invention, even when the seat back is inclined forwards from the setting state and the teeth portion 512a of the lower teeth section 512 is insufficiently separated from a sliding face 503b, the lower teeth section 512 can be rotated by the tapered face 503f in a direction in which the lower teeth section 512 is separated from the sliding face 503b, thereby preventing the teeth portion of the lower teeth section from being damaged. Further, since the corner portion of the sliding face is formed in the shape of an obtuse angle, the durability of a mold therefor can be improved at the molding time of the upper teeth section.

What is claimed is:

1. A reclining apparatus comprising:
   arm means for fixing a seat back thereto pivotally mounted to a holder plate means and having a latch gear portion;
   lower teeth means pivotally mounted to the holder plate means and engaged with and disengaged from the latch gear portion to lock and unlock the arm means;
   cam means pivotally mounted to the holder plate means and contacting the lower teeth means;
   a joining portion joined to the cam means and an operating lever means; and
   means for moving the joining portion to locate the joining portion invisibly behind the rear side of the holder plate means when the lower teeth means is completely locked with the latch gear portion, and to locate at least a portion of the joining portion visibly from the outside of the holder plate means when the lower teeth means is incompletely locked with the latch gear portion.

2. A reclining apparatus as claimed in claim 1, wherein the holder plate means is fixed to a base plate at a suitable distance.

3. A reclining apparatus as claimed in claim 1, wherein the lower teeth means has a teeth portion engaged with and disengaged from the latch gear portion to lock and unlock the arm means.

4. A reclining apparatus as claimed in claim 3, wherein the teeth portion of the lower teeth means contacts the cam means.

5. A reclining apparatus as claimed in claim 1, wherein the operating lever means and the cam means are coaxially disposed with respect to each other.

6. A reclining apparatus comprising:
   base plate means for fixing a seat cushion thereto;
   arm means for fixing a seat back thereto and pivotally mounted to the base plate means;
   upper teeth means fixed to the arm means;
   lower teeth means engageable with the upper teeth means and pivotally mounted to the base plate means;
   operating lever means engageable with the lower teeth means and pivotally mounted to the base plate means for separating the lower teeth means from the upper teeth means to unlock the arm means and reclining the seat back;
   holder plate means opposite the base plate means and supporting therebetween the arm means, the upper teeth means and the lower teeth means;
   said lower teeth means having a shaft portion projecting outwards from the holder plate means; and
   pedal-link means pivotally mounted to said shaft portion and the operating lever means for actuating the operating lever means from an opposite side thereof.

7. A reclining apparatus as claimed in claim 6, wherein the lower teeth means has a teeth portion engaged with the upper teeth means.

8. A reclining apparatus as claimed in claim 6, wherein the operating lever means has a cam engaged with the lower teeth means.

9. A reclining apparatus as claimed in claim 6, wherein the pedal-link means comprises a pedal and a link connected to the pedal.

10. A reclining apparatus as claimed in claim 6, wherein a spring for biasing the arm means is disposed.

11. A seat apparatus including, first and second reclining apparatuses disposed on either side of a seat back to lock and unlock the seat back, said seat apparatus comprising:
    wire means for actuating the first and second reclining apparatuses in association with each other;
    first lever means pivotally mounted to the first reclining apparatus and connected to one end of the wire means; and
    second lever means disposed in the second reclining apparatus and connected to the other end of the wire means.

12. A seat apparatus as claimed in claim 11, wherein the first lever means comprises a first operating lever disposed in the first reclining apparatus, and a back lever pivotally mounted to the first reclining apparatus and connected to one end of the wire means and rotated in association with the first operating lever.

13. A seat apparatus as claimed in claim 12, wherein said apparatus further comprises a latchet pivotally mounted to a base plate and the back lever is pivotally mounted to the first reclining apparatus coaxially with the latchet.

14. A reclining apparatus comprising:
    base plate means fixed to a seat cushion;
    arm means pivotally mounted to the base plate means and fixed to a seat back and having latch gear means and a sliding face projecting from the latch gear means;
    means for biasing the arm means on the side of seat cushion;
    lower teeth means pivotally mounted to the base plate means and having a teeth portion engagable with and disengagable from the latch gear means; and
    means for separating the teeth portion of the lower teeth means from the sliding face when the sliding face contacts the teeth portion of the lower teeth means by the biasing force of the biasing means.

15. A reclining apparatus as claimed in claim 14, wherein the separating means comprises a tapered face disposed in a corner portion of the sliding face in which the angle between the taper means and a straight line extending from an upper edge of an end bottom portion of the latch gear means in the normal direction of a pitch circle of the latch gear means is close to an angle of pressure applied by the latch gear means.

16. A reclining apparatus as claimed in claim 14, wherein the sliding face of the arm means rises from the end bottom portion of the latch gear means and projects from a teeth tip of the latch gear means.

17. A reclining apparatus as claimed in claim 14, wherein the corner portion of the sliding face is formed in the shape of an obtuse angle.

* * * * *